(12) United States Patent
Klank et al.

(10) Patent No.: US 9,266,401 B2
(45) Date of Patent: Feb. 23, 2016

(54) TRAILER COUPLING

(71) Applicant: ZF Friedrichshafen AG, Friedrichshafen (DE)

(72) Inventors: Michael Klank, Osnabruck (DE); Julian Stratmann, Osnabruck (DE); Lutz Pydde, Ankum (DE); Jens Vortmeyer, Preussisch Oldendorf (DE); Christoph Elbers, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/386,022

(22) PCT Filed: Mar. 15, 2013

(86) PCT No.: PCT/EP2013/055315
§ 371 (c)(1),
(2) Date: Sep. 18, 2014

(87) PCT Pub. No.: WO2013/156217
PCT Pub. Date: Oct. 24, 2013

(65) Prior Publication Data
US 2015/0035256 A1    Feb. 5, 2015

(30) Foreign Application Priority Data

Apr. 16, 2012 (DE) .......................... 10 2012 206 133

(51) Int. Cl.
*B60D 1/58* (2006.01)
*B60D 1/28* (2006.01)
(Continued)

(52) U.S. Cl.
CPC *B60D 1/58* (2013.01); *B60D 1/065* (2013.01); *B60D 1/28* (2013.01); *B60D 1/62* (2013.01); *G01B 7/30* (2013.01)

(58) Field of Classification Search
CPC .................................... B60D 1/58; B60D 1/06
USPC .......................................... 280/504, 507, 511
See application file for complete search history.

(56) References Cited

U.S. PATENT DOCUMENTS 8,444,169 B1 * 5/2013 Katz .............................. 280/511
2006/0071448 A1 * 4/2006 Craig et al. ................... 280/511
(Continued)

FOREIGN PATENT DOCUMENTS

DE    10 2008 019 713 A1    10/2009
DE    10 2009 057 871 A1    6/2011
(Continued)

OTHER PUBLICATIONS

German Search Report Corresponding to 10 2012 206 133.9 mailed Dec. 11, 2012.
(Continued)

*Primary Examiner* — Joseph Rocca
*Assistant Examiner* — Jacob Knutson
(74) *Attorney, Agent, or Firm* — Davis & Bujold, P.L.L.C.; Michael J. Bujold

(57) ABSTRACT

A trailer coupling with a ball support and a coupling ball arranged at a free end of the ball support. A coupling ball holder is fitted onto and can rotate on the coupling ball. A locking element is provided on the coupling ball holder by which the coupling ball holder is secured against being inadvertently removed from the coupling ball. An angle measuring device, provided on the coupling ball, comprises sensors which can detect rotation of the coupling ball holder relative to the coupling ball about a rotation axis. The position of the locking element, relative to the coupling ball, can be determined using the sensors.

11 Claims, 3 Drawing Sheets

(51) Int. Cl.
  *G01B 7/30* (2006.01)
  *B60D 1/06* (2006.01)
  *B60D 1/62* (2006.01)

(56) References Cited

U.S. PATENT DOCUMENTS

2010/0096203 A1* 4/2010 Freese, V et al. ............. 180/167
2013/0341888 A1* 12/2013 Kadnikov et al. ............. 280/511

FOREIGN PATENT DOCUMENTS

| DE | 10 2010 011 741 A1 | 9/2011 |
| DE | 102010011741 A1 * | 9/2011 |
| DE | 10 2010 033 641 A1 | 2/2012 |
| DE | 20 2011 005 144 U1 | 3/2012 |
| EP | 1 796 926 B1 | 1/2009 |
| EP | 2 366 563 A2 | 9/2011 |
| WO | 2007/093069 A1 | 8/2007 |

OTHER PUBLICATIONS

International Search Report Corresponding to PCT/EP2013/055315 mailed Jul. 16, 2013.
Written Opinion Corresponding to PCT/EP2013/055315 mailed Jul. 16, 2013.

* cited by examiner

TRAILER COUPLING

This application is a National Stage completion of PCT/EP2013/055315 filed Mar. 15, 2013, which claims priority from German patent application serial no. 10 2012 206 133.9 filed Apr. 16, 2012.

FIELD OF THE INVENTION

The invention concerns a trailer coupling with a ball carrier, a coupling ball arranged at a free end of the ball carrier, a coupling ball holder which fits onto and can rotate on the coupling ball, a locking element provided on the coupling ball holder, by means of which the coupling ball holder is secured against being lifted off the coupling ball, and an angle measuring device provided on the coupling ball, which has sensors by means of which a rotation of the coupling ball holder relative to the coupling ball around a rotational axis can be detected.

BACKGROUND OF THE INVENTION

A trailer coupling of this type is known from EP 1 796 926 B1, in which the angle measuring device comprises a permanent magnet and sensors that are sensitive to a magnetic field. In this case, however, components of the angle measuring device are provided both on the coupling ball and on the coupling ball holder. Thus, when a trailer is used which has a simple coupling ball holder in which no components of the angle measuring device are additionally built in, the rotation detection does not work.

SUMMARY OF THE INVENTION

Starting from there, the purpose of the present invention is to enable rotation angle measurement even with a simple coupling ball holder which is not designed in any special way for such angle measurement.

This objective is achieved by a trailer coupling according to the description below, The trailer coupling has a ball carrier, a coupling ball arranged at a free end of the ball carrier, a coupling ball holder which fits onto and can rotate on the coupling ball, a locking element provided on the coupling ball holder, by means of which the coupling ball holder is secured against being lifted off the coupling ball, and an angle measuring device provided on the coupling ball, which has sensors by means of which rotation of the coupling ball holder relative to the coupling ball around a rotational axis can be detected, so that by means of the sensors the position of the locking element relative to the coupling ball can be determined.

The locking element prevents the coupling ball holder from becoming detached from the coupling ball. As a rule such a locking element is present in coupling ball holders of standard design, so they can be used for angle measurement without having to make any modifications. From the information about the position of the locking element, rotation of the coupling ball holder relative to the coupling ball can be determined. In particular, for angle measurement no structural modifications have to be made to the coupling ball holder, so that any possible weakening of the trailer coupling due to such modifications can be avoided. In particular, the rotational axis passes through the mid-point of the coupling ball.

By means of the sensors, the position of the locking element relative to the coupling ball can be detected, preferably in a plane extending perpendicularly to the rotational axis. Advantageously, that plane extends through the mid-point of the coupling ball. The position of the locking element relative to the coupling ball is in particular a rotational position. Preferably, the position of the locking element relative to the coupling ball is characterized by an angle through which the locking element has rotated about the rotational axis relative to the coupling ball. That angle can also be called the rotation angle or deflection angle of the locking element. In particular, the rotation angle of the locking element can be determined by means of the sensors. Preferably, the detection of the rotation angle corresponds to the determination of the position of the locking element.

It is possible that the sensors determine the rotation angle of the locking element only in a relative manner. However, it is preferable for the sensors to determine the rotation angle of the locking element absolutely. If that is so, then there is no need for offset compensation, for example in a maneuvering assistance function. Offset compensation is understood to mean the determination of an existing deviation, which can for example be caused by manufacturing tolerances of the components positioned in relation to one another. Preferably, the rotation angle is determined starting from a reference position of the locking element (zero mark), which is advantageously associated with a value of 0°. The position of the locking element can for example be determined inductively, capacitatively and/or resistively (particularly by using piezoresistive sensors).

The locking element is delimited in its circumferential direction in particular by lateral edges whose position relative to the coupling ball can be detected by the sensors. The circumferential direction relates in particular to the rotational axis. Thus, the circumferential direction preferably extends around the rotational axis. The position of each lateral edge relative to the coupling ball is in particular a rotation position. Preferably, the position of each lateral edge relative to the coupling ball is characterized by a rotation angle by which the lateral edge concerned is rotated about the rotational axis relative to the coupling ball. Advantageously, the rotation angle can be detected by the sensors for each of the lateral edges. From the rotation angles of the lateral edges, in particular the rotation angle of the locking element can be determined. Preferably, detection of the rotation angle of the lateral edges corresponds to the determination of the position of the locking element.

Preferably, in the area of the lateral edges a free space is provided in each case, whose position can be detected by the sensors. The free spaces are in particular produced because in the circumferential direction the lateral edges are rounded toward the outside. For example, the free spaces are located between the lateral edges and the coupling ball. The position of the free spaces can be detected by the sensors relatively easily, as explained later. In particular, the position of each free space relative to the coupling ball is a rotation position. Preferably, the position of each free space relative to the coupling ball is characterized by a rotation angle by which the free space concerned is rotated about the rotational axis relative to the coupling ball. Advantageously, for each of the free spaces the rotation angle can be determined by the sensors. From the rotation angles of the free spaces, in particular the rotation angle of the locking element can be determined. Preferably, the detection of the rotation angles of the free spaces corresponds to the determination of the position of the locking element. In particular, the detection of the rotation angles of the free spaces corresponds to the determination of the rotation angles of the lateral edges.

The above-mentioned lateral edges and/or free spaces are as a rule present in coupling ball holders of standard design, so that no special measures have to be applied to them for the angle measurement.

Advantageously, together with the locking element, the coupling ball holder forms a ball socket that encloses the coupling ball. Preferably, except for the free spaces the ball socket is in contact with the coupling ball in the circumferential direction and/or around it. In particular, the ball socket has a hollow-spherical bearing surface which is in contact with the spherical outer surface of the coupling ball. Preferably, one part of the hollow-spherical bearing surface is provided on the coupling ball holder and another part of the hollow-spherical bearing surface is on the locking element. Advantageously, the coupling ball holder has a recess in which the one part of the hollow-spherical bearing surface is provided. Preferably, the locking element is located in the recess or at the edge thereof.

Since in the area of the free spaces neither the coupling ball holder nor the locking element are in contact with the coupling ball, the position of the free spaces can be detected by the sensors by means of distance measurements. In particular, there is a clear signal change between the free spaces (larger distance) and the areas where the ball socket is in contact with the coupling ball (smaller distance). In this case the sensors are in particular distance sensors.

Preferably, the locking element is pressed against the coupling ball, in particular by means of a clamping element. Thus, outside the free spaces the ball socket exerts pressure on the coupling ball. Accordingly, the position of the free spaces can be detected by the sensors by virtue of pressure or force measurement. In particular, there is a clear signal change between the free spaces (lower pressure) and the areas where the ball socket is in contact with the coupling ball (higher pressure). The sensors are in this case in particular pressure or force sensors. The clamping element is or comprises, for example, a spring.

By determining the position of the two lateral edges and/or that of the two free spaces, the position and/or rotation angle of the locking element can be determined absolutely. Preferably, the dimensions of the locking element in the circumferential direction are known. In particular, the dimensions of the locking element in the circumferential direction are smaller than half the outer diameter of the coupling ball and/or smaller than half the inside diameter of the ball socket. In that case the position and/or the rotation angle of the locking element can be recognized automatically, in particular even without information about the dimensions of the locking element in the circumferential direction.

According to a further development, the sensors of the angle measuring device are in the form of distance sensors and/or pressure sensors. In particular, the sensors are arranged on the coupling ball. Preferably, the sensors are arranged on a curve around the rotational axis. Advantageously, the curve is a circular arc. Preferably, the sensors are arranged next to and/or a distance away from one another. For example, the sensors are arranged on the coupling ball in a ring around the rotational axis. By means of the sensors, in particular the position of the locking element and/or the position of the lateral edges and/or the position of the free spaces can be detected. Advantageously, a measurement angle is associated with each of the sensors. Preferably, in that case different angles are associated with different sensors. When one of the sensors detects one of the lateral edges or one of the free spaces, then the position of that lateral edge or free space corresponds in particular to the measurement angle associated with the sensor. Thus, the resolution of the angle measuring device can be determined by the number of sensors. For example, the number of sensors can be twenty.

Preferably, the sensors are embedded into the coupling ball. Then, it is possible not just from the sensor standpoint but also in mechanical terms to use coupling ball holders of standard design. For example, a groove is formed in the coupling ball around the rotational axis, in which groove the sensors are arranged. Furthermore, in a ring around the rotational axis a number of recesses can be formed, in which the sensors are positioned.

The coupling ball holder and/or the locking element are preferably made of metal, in particular steel. The coupling ball holder and/or the locking element preferably consist of an electrically conducting material. Accordingly, the free spaces can be detected by capacitative measurements. For this a plurality of capacitative sensors can be provided, which are for example designed as follows. Each capacitative sensor comprises two electrodes arranged on the coupling ball, which are a certain distance apart and which preferably extend in the radial direction. The ball socket forms a third electrode, which delimits the space enclosed by the other two electrodes in the radial direction. However, in the area of the free spaces the third electrode is absent, and this causes a capacitance change between the other two electrodes. That capacitance change can be measured and the position of the free space can therefore be detected. Thus, the sensors can be in the form of capacitative distance sensors.

Preferably, the coupling ball holder and/or the locking element consist of a magnetic material, in particular a ferromagnetic material. Thus, for example electrical coils can be used as sensors in order to detect the position of the free spaces. The ball socket influences the impedance, in particular the inductance of the sensors. In the area of the free spaces, however, that influence is absent and this results in a change of the impedance and in particular the inductance. That impedance and in particular inductance change can be measured and the position of the free space is accordingly detectable. Preferably, the sensors are in the form of inductive distance sensors.

The locking element is in particular fitted onto the coupling ball holder, preferably so that it can move. Advantageously, the locking element is or can be brought in contact with the coupling ball, in particular by means of an actuating element. Preferably, the coupling ball holder comprises the actuating element, which is for example in the form of a lever. Advantageously, the locking element is or can be fixed in its position in contact with the coupling ball, in particular by means of a locking mechanism and/or by means of the actuating element and/or by means of the actuating element with interposition of the locking mechanism. For example, the locking mechanism can be actuated by the actuating element. Moreover, the actuating element can form part of the locking mechanism. In particular, the locking element can be pulled clear of the coupling ball, preferably by means of the actuating element and/or the locking mechanism. This makes it possible to detach the coupling ball holder form the coupling ball, in particular to lift it clear. According to a further development, the coupling ball holder comprises the clamping element by means of which the locking element is pushed or can be clamped against the coupling ball. The clamping element can form part of the locking mechanism.

The coupling ball is in particular attached firmly, preferably solidly to the ball carrier. For example the ball carrier and the coupling ball are formed integrally, preferably of the same material. Thus a rear carrier such as a bicycle carrier can be fitted onto the coupling ball. The use of a trailer with roll damping is also possible. The diameter of the coupling ball is preferably 50 mm.

The ball carrier is preferably provided on a tractor vehicle, in particular one that is a motor vehicle. For example the ball carrier is connected firmly, in particular solidly, to a vehicle body and/or a chassis and/or a transverse support member of the tractor vehicle. Preferably, the rotational axis extends parallel to a vertical axis of the tractor vehicle. Preferably, the rotational axis intersects a central longitudinal axis of the tractor vehicle. The coupling ball holder is preferably provided on a trailer vehicle. In particular, the coupling ball holder is arranged at a front end of a tow-bar of the trailer vehicle.

The tractor vehicle and the trailer vehicle are connected to one another by the trailer coupling so as to form a tractor-trailer combination. The angle enclosed between the longitudinal axis of the tractor vehicle and the longitudinal axis of the trailer vehicle is also called the articulation angle. In particular, the articulation angle lies in a plane perpendicular to the vertical axis of the tractor vehicle. The position of the locking element, in particular its rotation angle, is or preferably represents the articulation angle. In particular, the reference position is defined by the position of the longitudinal axis of the tractor vehicle which is aligned with the longitudinal axis of the trailer vehicle when the trailer is not deflected, so that the articulation angle enclosed is 0°.

In a further development an evaluation unit is connected to the sensors, by means of which the position, in particular the rotation angle of the locking element and/or the articulation angle can be determined, in particular from the rotation angles of the lateral edges and/or of the free spaces. The angle measuring device can incorporate the evaluation unit. Alternatively, the evaluation unit can also be provided separately from the angle measuring device.

BRIEF DESCRIPTION OF THE DRAWINGS

Below, the invention is described with reference to a preferred embodiment illustrated in the drawings, which show.

DETAILED DESCRIPTION OF THE PREFERRED EMBODIMENT

Figure 1:
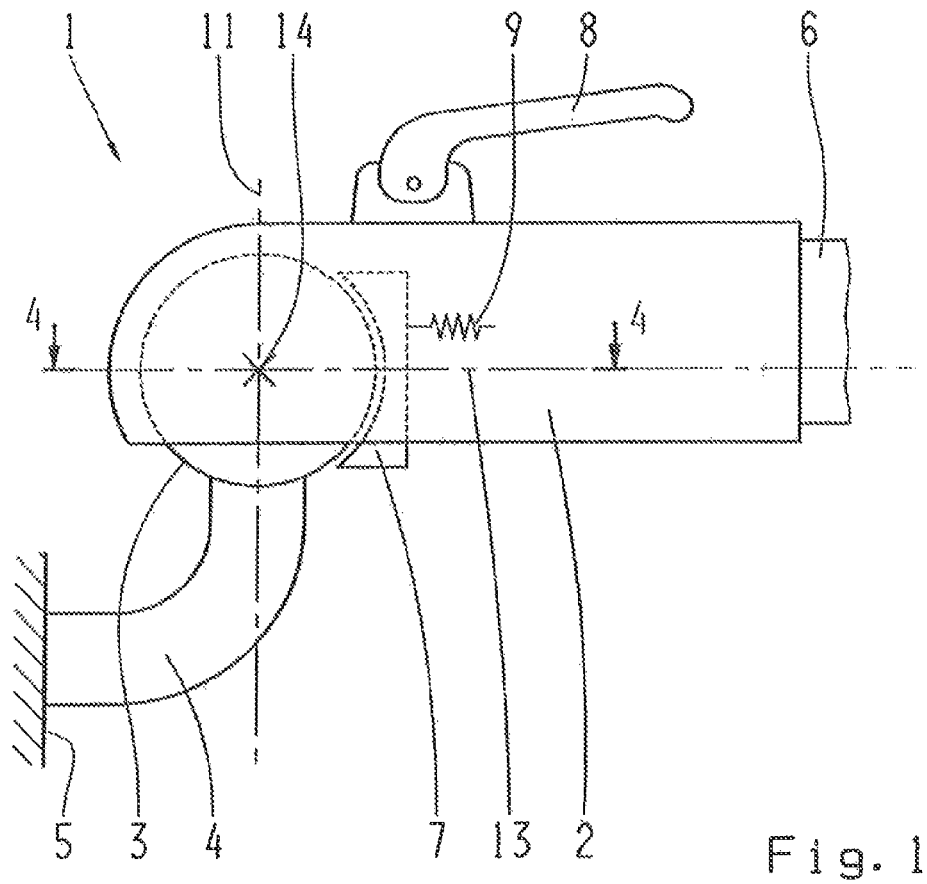
FIG. 1: A schematic side view of a trailer coupling according to an embodiment of the invention.

FIGS. 1 to 4 show various representations and partial views of a trailer coupling 1 according to an embodiment, such that a coupling ball holder 2 is fitted onto a coupling ball 3 of a curved ball carrier 4. The upwardly directed coupling ball 3 is provided on a free end of the ball carrier 4 and is in particular made integrally therewith. Furthermore, the ball carrier 4 is connected solidly to a rear transverse support member 5 of a tractor vehicle and the coupling ball holder 2 is connected firmly to a front end of a tow-bar 6 of a trailer vehicle. So that the coupling ball holder 2 cannot be inadvertently lifted off the coupling ball 3, the coupling ball holder comprises a locking element 7 which can be brought into contact with the coupling ball 3 by actuating a lever 8. The locking element 7 secures the coupling ball holder 2 with shape interlock on the coupling ball 3 and is additionally pressed against the latter by a schematically indicated spring 9. The coupling ball holder 2 and the locking element 7 together form a ball socket 10 that encloses the coupling ball 3 (see FIG. 2) and which is fitted onto and able to rotate on the coupling ball 3.

Figure 4:
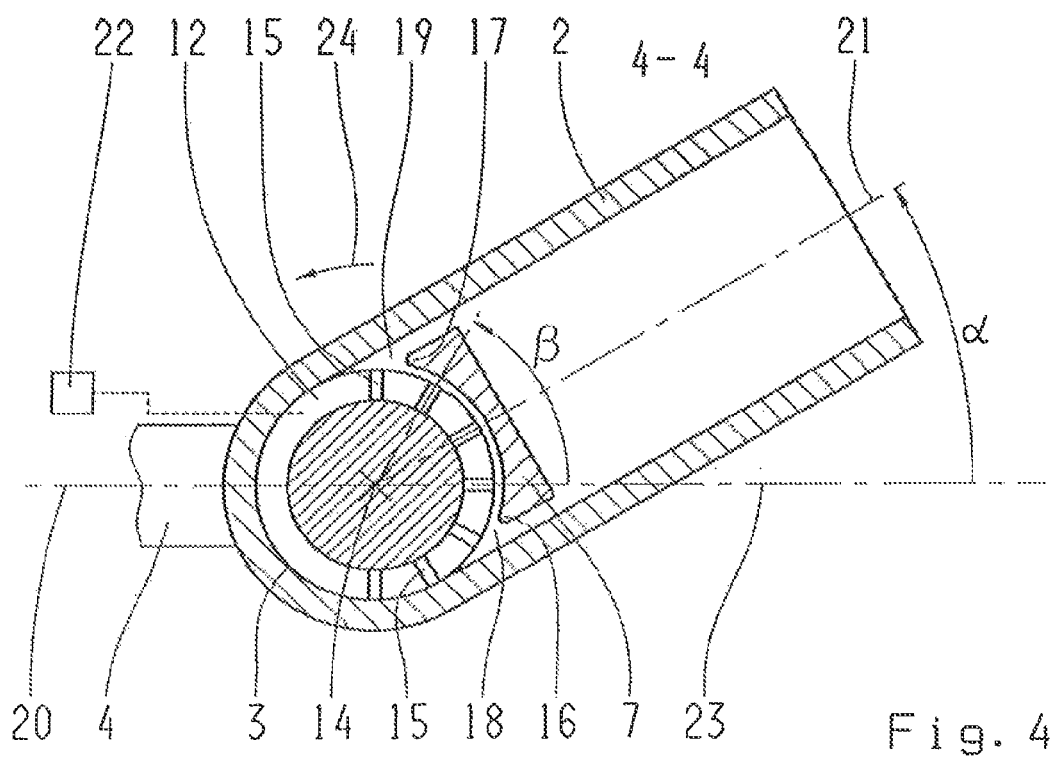
FIG. 4: A schematic sectioned view of the trailer coupling along the section line 4-4 shown in FIG. 1.
Figure 2:
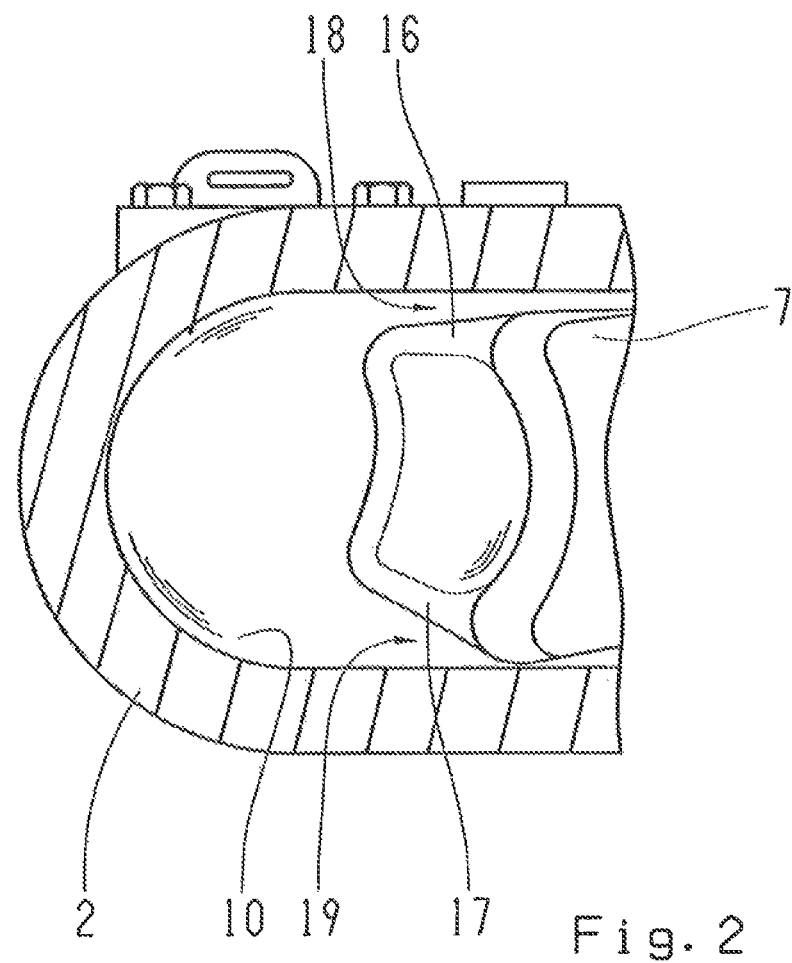
FIG. 2: A view from below of the coupling ball holder that can be seen in FIG. 1, without the coupling ball.
Figure 3:
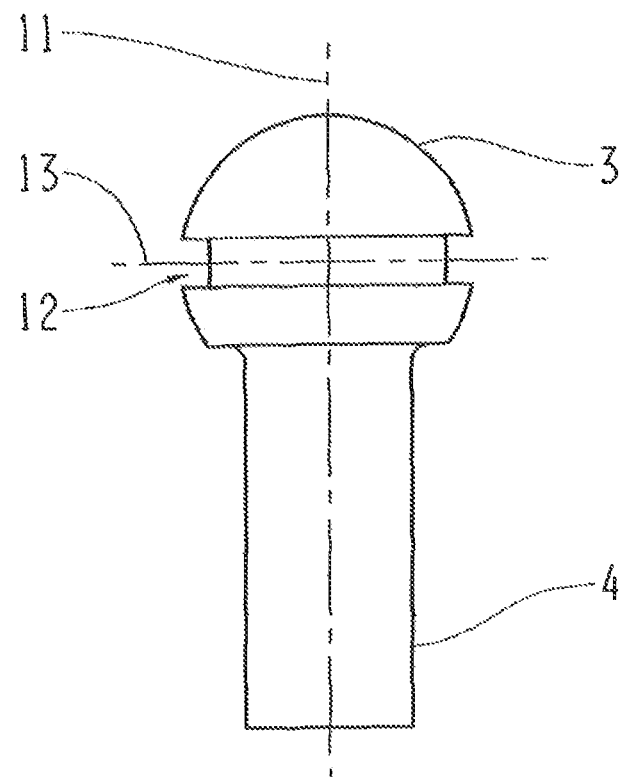
FIG. 3: A side view of the coupling ball without the coupling ball holder and without sensors.

In the coupling ball 3 is formed an all-round annular groove 12 around a rotational axis 11, which groove extends in a plane 13 orientated perpendicularly to the rotational axis 11, in which plane the mid-point 14 of the coupling ball 3 is preferably located. The rotational axis 11, also called the vertical axis, extends, in particular, parallel to a vertical axis of the tractor vehicle. Preferably, the rotational axis 11 also intersects a central longitudinal axis 20 of the tractor vehicle. In the annular groove 12 around the rotational axis 11 are arranged a plurality of inductive distance sensors 15, some of which are shown schematically in FIG. 4. In contrast, FIG. 3 shows the coupling ball 3 before the fitting of the sensors 15. The measurement direction of each sensor 15, which extends radially away from the rotational axis 11, encloses, with the central longitudinal axis 20, a defined measurement angle which is different for each sensor. For one of the sensors 15 the measurement angle, indexed $\beta$, is shown in FIG. 4.

In a circumferential direction 24 relative to the rotational axis 11, the locking element 7 is delimited by lateral edges 16 and 17, each of which is rounded toward the outside. Consequently, in the area of the lateral edges 16 and 17 there are free spaces 18 and 19, which can be detected by the sensors 15. Since the measurement angles of the sensors 15 are known, by determining the sensors that detect the free spaces, the position of the free spaces is also known. In this case the position of each free space is in particular indicated in the form of a rotation angle, which preferably corresponds to the respective measurement angle. If one and the same free space is detected by more than one, for example by two adjacent sensors, a mathematical approximation can also be used to determine the rotation angle.

If the position of the free spaces 18 and 19 is known, the articulation angle $\alpha$ enclosed between the longitudinal axis 20 of the tractor vehicle and a longitudinal axis 21 of the trailer vehicle can be determined by an evaluation unit 22 connected electrically to the sensors 15, the unit being provided for example on or in the tractor vehicle or on the ball carrier 4. The broken line 23 indicates a reference position, relative to which the articulation angle $\alpha$ is determined. In particular, the line 23 coincides with the longitudinal axis 20 and therefore characterizes the undeflected condition of the trailer vehicle, i.e. $\alpha=0°$. The angle $\alpha$ also represents the position and/or rotation angle of the locking element 7. In particular, the angle $\alpha$ is obtained as the arithmetical mean of the rotation angles determined for the free spaces 18 and 19. If the rotation angle determined for the free space 18 is $\beta 1$ and the rotation angle determined for the free space 19 is $\beta 2$, then for example the angle a is given by: $\alpha=(\beta 1+\beta 2)/2$.

INDEXES

1 Trailer coupling
2 Coupling ball holder
3 Coupling ball
4 Ball carrier
5 Rear transverse support
6 Tow-bar of the trailer vehicle
7 Locking element
8 Lever
9 Spring
10 Ball socket
11 Rotational axis
12 Annular groove 13 Plane
14 Mid-point of the coupling ball
15 Sensor
16 Lateral edge of the locking element
17 Lateral edge of the locking element
18 Free space
19 Free space
20 Longitudinal axis of the tractor vehicle
21 Longitudinal axis of the trailer vehicle
22 Evaluation unit
23 Line
24 Circumferential direction
α Articulation angle/position of the locking element
β Measurement angle

The invention claimed is:

1. A trailer coupling with a ball support (4), and a coupling ball (3) being arranged at a free end of the ball support (4),
   a coupling ball holder (2) being fitted onto and being rotatable on the coupling ball (3),
   a locking element (7) provided on the coupling ball holder (2) by which the coupling ball holder (2) is secured against being removed from the coupling ball, the coupling ball having a groove that extends at least half way around the coupling ball, and an angle
   measuring device comprising a plurality of sensors which are spaced apart from each other and located within the groove inside a periphery of the coupling ball (3) and by which rotation of the coupling ball holder (2), relative to the coupling ball (3) about a rotation axis (11), is detectable, and
   a position of the locking element (7), relative to the coupling ball (3), being determinable by the sensors (15),
   the locking element (7) is delimited, in a circumferential direction relative to the rotation axis (11), by lateral edges (16, 17), whose position is determinable by the sensors (15), and a distance between the coupling ball holder and each of the lateral edges of the locking element defines a respective free space, and
   the free spaces are arranged in an area of the lateral edges of the locking element, each of the sensors detects the free spaces when aligned therewith such that a position of the free spaces are determinable by the sensors.

2. The trailer coupling according to claim 1, wherein the position of the locking element (7), relative to the coupling ball (3) in a plane (13) that extends perpendicularly to the rotation axis (11), is determinable by the sensors (15).

3. The trailer coupling according to claim 1, wherein the locking element (7) and the coupling ball holder (2) together form a ball socket (10) that encloses the coupling ball (3), and the ball socket, other than at the free spaces (18, 19), contacts the coupling ball (3) in the circumferential direction (24).

4. The trailer coupling according to claim 1, wherein the sensors (15) are either distance or pressure sensors and include a central sensor, and the sensors are arranged on a circumference of the coupling ball (3) at defined measurement angles around the rotation axis (11) with respect to a longitudinal axis of a vehicle that bisects the rotation axis and defines a position of the central sensor.

5. The trailer coupling according to claim 1, wherein the groove is an annular groove and the sensors are embedded in the annular groove.

6. The trailer coupling according to claim 1, wherein the locking element (7), fitted on the coupling ball holder (2) and in contact with the coupling ball (3), is removable from the coupling ball (3).

7. The trailer coupling according to claim 1, wherein the ball support (4) is supported by a tractor vehicle and the coupling ball holder (2) is supported by a trailer vehicle.

8. A trailer coupling with a ball support (4), and a coupling ball (3) being arranged at a free end of the ball support (4),
   a coupling ball holder (2) being fitted onto and being rotatable on the coupling ball (3),
   a locking element (7) provided on the coupling ball holder (2) by which the coupling ball holder (2) is secured against being removed from the coupling ball (3), the locking element has lateral edges, and a circumferential distance between each of the lateral edges and the coupling ball holder defines a gap, the coupling ball having a groove that extends at least half way around the coupling ball, and an angle
   measuring device is solely provided on the coupling ball (3) and comprises sensors (15) by which rotation of the coupling ball holder (2), relative to the coupling ball (3) about a rotation axis (11), is detectable, the sensors including a central sensor and are located within the groove and inside a periphery of the coupling ball at different defined measurement angles from a longitudinal axis that extends through the rotation axis and the central sensor, and the sensors detect the gaps as the coupling ball holder rotates about the rotation axis,
   a rotational position of the locking element (7), relative to the coupling ball (3), being determinable by the defined measurement angle of the sensor (15) which is aligned with the gap in the rotational position of the locking element, and
   the sensors (15) are inductive distance sensors.

9. A trailer coupling comprises:
   a ball support and a coupling ball, the coupling ball being fixed to a free end of the ball support and defining a vertical rotation axis extending through a center of the coupling ball, and the coupling ball having a groove that extends at least half way around the coupling ball; a coupling ball holder
   coupling the coupling ball and defining a horizontal plane that extends through the center of the coupling ball, and the coupling ball holder being pivotable about the rotation axis with respect to the coupling ball;
   a locking element being supported on the coupling ball holder and engaging the coupling ball to prevent vertical displacement of the coupling ball holder along the rotation axis with respect to the coupling ball, lateral edges of the locking element delimit the locking element in a circumferential direction relative to the rotation axis, the locking element is supported such that a free space is formed in the circumferential direction between each of the lateral edges and the coupling ball holder;
   an angle measuring device is solely arranged on the coupling ball and comprises a plurality of sensors, the plurality of sensors being fixedly located within the groove and inside a periphery of the coupling ball and around a circumference of the coupling ball, the circumference of the coupling ball being located in the horizontal plane of the coupling ball holder that extends through the center of the coupling ball, and the plurality of sensors being inductive distance sensors that are spaced from one another by measurement angles having vertices at the center of the coupling ball, the plurality of sensors comprise a central sensor aligned on a longitudinal axis that intersects the rotation axis; and
   the plurality of sensors detecting the free spaces in the horizontal plane for determining rotation of the coupling ball holder relative to the coupling ball.

10. The trailer coupling according to claim 9, wherein each of the plurality of sensors are located around the circumference of the coupling ball at known measurement angles, two sensors of the plurality of sensors adjacent to the central sensor and positioned on opposite sides of the longitudinal axis are arranged at a same measurement angle away from the longitudinal axis such that rotation of the coupling ball holder relative to the coupling ball is determined by the location of the plurality of sensors which detect the free space.

11. The trailer coupling according to claim 9, wherein the groove is an annular groove, and the plurality of sensors are fixed in the annular groove at known articulation angles.

* * * * *